Patented Aug. 18, 1942

2,293,465

UNITED STATES PATENT OFFICE 2,293,465

PROCESS FOR THE MANUFACTURE OF MERCAPTOTHIAZOLINES

Jacob Eden Jansen, Akron, Ohio, assignor to The B. F. Goodrich Company, New York, N. Y., a corporation of New York No Drawing. Application March 19, 1941, Serial No. 384,141

3 Claims. (Cl. 260—302)

This invention relates to an improved process for the manufacture of certain heterocyclic compounds and pertains specifically to the preparation of mercaptothiazolines. These compounds are of value as accelerators for the vulcanization of rubber.

There has been described in the literature a method which comprises reacting equimolecular proportions of ethanolamine and carbon disulfide in the presence of less than one mole of potassium hydroxide. The yields of 2-mercaptothiazoline from this process are so low that it is not practical for commercial use.

I have discovered that remarkably improved yields may be obtained by using two or more moles of carbon disulfide, one of which acts as a dehydrating agent under special conditions as described hereafter. It will be apparent from the nature of the reaction that it may be adapted to the production of heterocyclic mercapto compounds containing six or more members in the ring from homologues of ethanolamine such as 1,3-propanolamine, etc. Similarly, alkyl-substituted thiazolines of the general structure

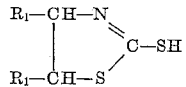

where $R_1$ and $R_2$ are hydrogen atoms or alkyl groups may be prepared from a substituted ethanolamine such as

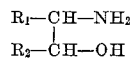

where $R_1$ and $R_2$ are hydrogen atoms or alkyl groups, with only slight modification of the reaction conditions. For example, 1,2-dimethyl ethanolamine yields 4,5-dimethyl 2-mercaptothiazoline. Other homologues such as 1-methyl ethanolamine, 2-methyl ethanolamine, 1-ethyl ethanolamine, 1,2-diethyl ethanolamine, and the like give analogous results. Cycloalkyl, alkoxy, aryl and aralkyl derivatives of hydroxyamines may also be used to give such products as 4-methoxy 2-mercaptothiazoline, 4,5-tetramethylene 2-mercaptothiazoline, 5-phenyl 2-mercaptothiazoline, 4-benzyl 2-mercaptothiazoline, and the like.

I have discovered that a dehydrating effect may be obtained with the additional mole of carbon disulfide by using in conjunction with it at least two moles of strong alkali and heating the reaction to 80° C. or higher. Although the lower limit of two moles of alkali is a critical one, below which the reaction does not give a satisfactory yield, the optimum yield is obtained with from three to four moles of alkali. When four moles of alkali are used, it is believed that the reaction takes place as follows:

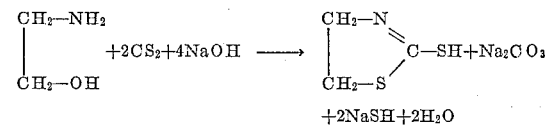

Inasmuch as the reaction gives quite high yields, up to about 70%, with only two moles of alkali, it appears that the mechanism is not so simple as that illustrated above; however, that the reaction follows some such course is shown by the fact that the products of the reaction have been identified, and also by the fact that decreasing the amount of carbon disulfide below two moles produces a marked decrease in yield.

My new reaction is preferably carried out in water, although other solvents such as benzene, hexane, or isopropyl acetate with or without additional water, or wetting agents together with water may also be used.

In the preferred embodiment of my invention at least two molecular proportions of carbon disulfide are added slowly, with stirring and cooling, to a mixture of one molecular proportion of ethanolamine and at least two, preferably three or four molecular proportions of alkali in water. After the initial exothermic reaction is over, slight heating may be necessary to maintain the mixture at the reflux temperature, about 45° C. Most of the carbon disulfide, after about three hours or more at this temperature, has reacted, although only about half of the 2-mercaptothiazoline has been produced; in order to complete the reaction the mixture should be heated to a somewhat higher temperature, 80° C. or more, for three or four additional hours.

If four moles of alkali are used, only two moles need be added at the beginning of the reaction; the remainder may be added just before the temperature is raised, or may be added gradually during the latter half of the reaction.

Most of the product precipitates from the reaction mixture as it is formed. The small amount left in solution can be completely precipitated by the addition of a relatively small amount (one-third mole) of a strong acid such as hydrochloric. Complete acidification of the mixture is not desirable because of excessive gassing, and because of the contamination of the product with an oily impurity.

The following examples describe the process more specifically, but the invention is not limited to these details.

*Example I*

There are dissolved in 2629 ml. of water 366 g. of ethanolamine, 961 g. of sodium hydroxide, and 0.5 g. of Nekal AEM (a commercial wetting agent), and the mixture is cooled to 35° C. With constant stirring there is added 1200 g. of carbon disulfide, and the mixture is cooled in ice-water to prevent the carbon disulfide from refluxing too vigorously. After an hour the cooling is discontinued and the reaction mixture is warmed to keep it at 45° C., the reflux temperature. After refluxing for about seven hours the reaction mixture is heated more strongly, and when a residue of carbon disulfide has boiled off the temperature rises to 100° C. where it is kept for three hours. Upon cooling to room temperature the 2-mercaptothiazoline is largely deposited as a solid, the remainder being precipitated by the addition of 200 ml. of concentrated hydrochloric acid. The product is filtered off, washed with water, and dried. A yield of 590 g. of material melting at 102° to 105° C. is obtained, representing a conversion of 83% of the theoretical.

*Example II*

The process is carried out as in Example I except that only two moles of alkali are added at the beginning, the third mole being added after about ninety minutes, and the fourth about an hour later. A yield of 73% of the theoretical is obtained.

The process of my invention is quite distinct from the methods appearing in the literature in that my process requires at least two molecular proportions of carbon disulphide and at least two molecular proportions of alkali for one molecular proportion of ethanolamine in order to obtain satisfactory yields. The essential feature of my invention is the utilization of part of the carbon disulfide as a dehydrating agent in the presence of a large amount of alkali.

Although I have herein disclosed specific embodiments of my invention, I do not intend to limit myself solely thereto, but only as defined by the spirit and scope of the appended claims.

I claim:

1. A process for producing 2-mercaptothiazoline which comprises reacting an aqueous solution of one molecular proportion of ethanolamine with substantially two molecular proportions of carbon disulfide in the presence of at least two molecular proportions of alkali at a temperature below about 50° C. until the carbon disulfide has substantially completely reacted followed by heating at a temperature of at least 80° C. until substantially all of the 2-mercaptothiazoline has precipitated.

2. A process for producing a 2-mercaptothiazoline of the formula

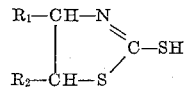

where $R_1$ and $R_2$ are members of the class consisting of hydrogen, alkyl, alkoxy, cycloalkyl, aryl, and aralkyl groups, which comprises reacting an aqueous solution of one molecular proportion of an ethanolamine of the formula

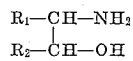

where $R_1$ and $R_2$ are members of the class consisting of hydrogen, alkyl, alkoxy, cycloalkyl, aryl, and aralkyl groups, with substantially two molecular proportions of carbon disulfide in the presence of at least two molecular proportions of alkali at a temperature below about 50° C. until the carbon disulfide has substantially completely reacted followed by heating at a temperature of at least 80° C. until substantially all of the 2-mercapthothiazoline product has precipitated.

3. A process for producing a heterocyclic mercapto compound embodying a ring consisting of at least three carbon atoms, one nitrogen atom, and one sulfur atom, one carbon atom of said ring being directly between the nitrogen and sulfur atoms and joined to the sulfur of the nonnuclear mercapto group, which comprises interacting one molecular proportion of a hydroxy alkyl amine with substantially two molecular proportions of carbon disulfide in the presence of at least two molecular proportions of alkali at a temperature below about 50° C. until the carbon disulfide has substantially completely reacted followed by heating at a temperature of at least 80° C. until substantially all of the mercaptan product has precipitated.

JACOB EDEN JANSEN.